(12) United States Patent
Doering et al.

(10) Patent No.: US 8,381,596 B2
(45) Date of Patent: Feb. 26, 2013

(54) CMOS COMPATIBLE PRESSURE SENSOR FOR LOW PRESSURES

(75) Inventors: Holger Doering, Sunnyvale, CA (US);
Rainer Cholewa, Santa Clara, CA (US)

(73) Assignee: Silicon Microstructures, Inc., Milpitas, CA (US)

( * ) Notice: Subject to any disclaimer, the term of this patent is extended or adjusted under 35 U.S.C. 154(b) by 20 days.

(21) Appl. No.: 12/972,373

(22) Filed: Dec. 17, 2010

(65) Prior Publication Data

US 2011/0146411 A1    Jun. 23, 2011

Related U.S. Application Data

(60) Provisional application No. 61/293,007, filed on Jan. 7, 2010.

(51) Int. Cl.
*G01L 9/06* (2006.01)
*G01L 7/00* (2006.01)
(52) U.S. Cl. .................. 73/721; 73/727; 73/754
(58) Field of Classification Search ............. 73/700–756
See application file for complete search history.

(56) References Cited

U.S. PATENT DOCUMENTS

| | | | |
|---|---|---|---|
| 5,165,289 A * | 11/1992 | Tilmans ............... | 73/862.59 |
| 6,093,579 A | 7/2000 | Sathe et al. | |
| 6,988,412 B1 * | 1/2006 | Wilner ............... | 73/754 |
| 7,111,518 B1 * | 9/2006 | Allen et al. ........... | 73/715 |
| 7,392,716 B2 * | 7/2008 | Wilner ............... | 73/862.627 |
| 7,487,681 B1 | 2/2009 | Allen | |
| 2003/0029245 A1 | 2/2003 | Izadnegahdar et al. | |
| 2004/0020305 A1 * | 2/2004 | Kurtz et al. ............ | 73/754 |
| 2005/0160814 A1 | 7/2005 | Vaganov et al. | |
| 2006/0272413 A1 | 12/2006 | Vaganov et al. | |

OTHER PUBLICATIONS

International Search Report mailed on Feb. 16, 2011, for PCT Patent Application No. PCT/US2010/061350, 3 pages.
Written Opinion of the International Searching Authority mailed on Feb. 16, 2011, for PCT Patent Application No. PCT/US2010/061350, 4 pages.
International Preliminary Report on Patentability mailed on Jul. 5, 2012 for PCT Patent Application No. PCT/US2010/061350, 6 pages.

\* cited by examiner

*Primary Examiner* — Andre Allen
(74) *Attorney, Agent, or Firm* — Kilpatrick Townsend & Stockton LLP

(57) ABSTRACT

Pressure sensors having a topside boss and a cavity formed using deep reactive-ion etching (DRIE) or plasma etching. Since the boss is formed on the topside, the boss is aligned to other features on the topside of the pressure sensor, such as a Wheatstone bridge or other circuit elements. Also, since the boss is formed as part of the diaphragm, the boss has a reduced mass and is less susceptible to the effects of gravity and acceleration. These pressure sensors may also have a cavity formed using a DRIE or plasma etch. Use of these etches result in a cavity having edges that are substantially orthogonal to the diaphragm, such that pressure sensor die area is reduced. The use of these etches also permits the use of p-doped wafers, which are compatible with conventional CMOS technologies.

24 Claims, 9 Drawing Sheets

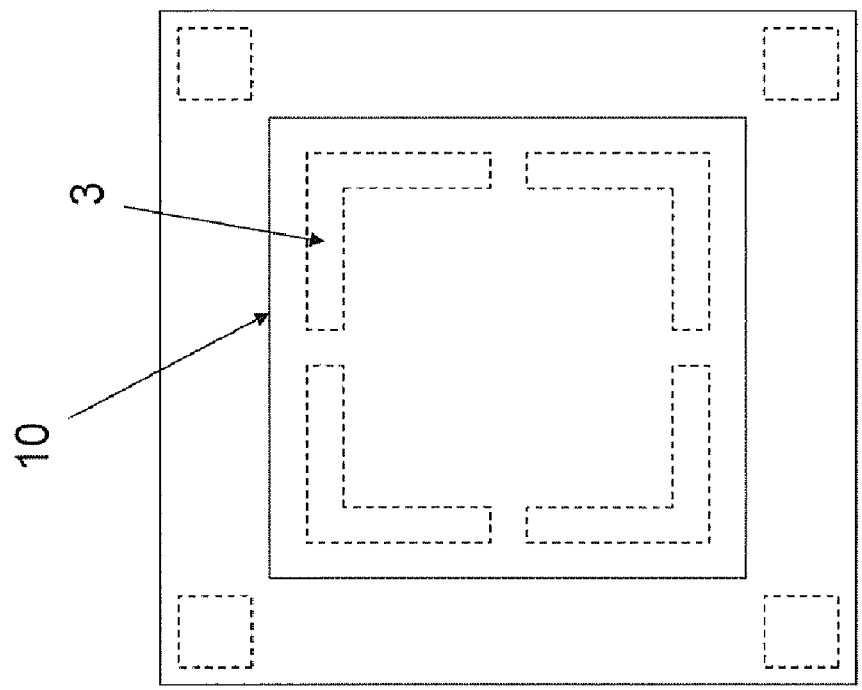
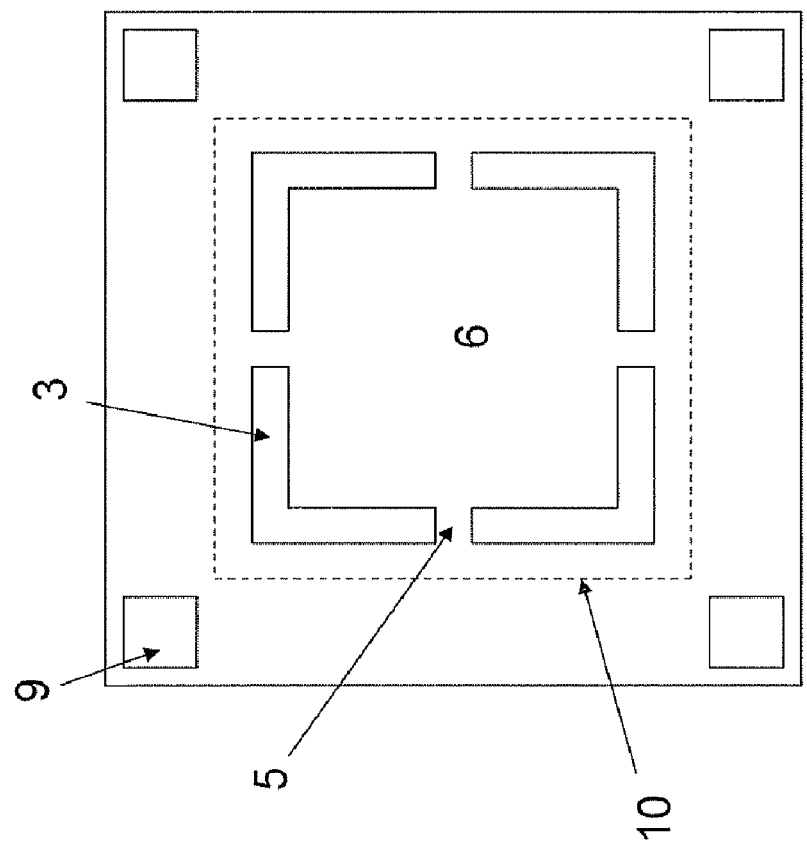
Fig. 3

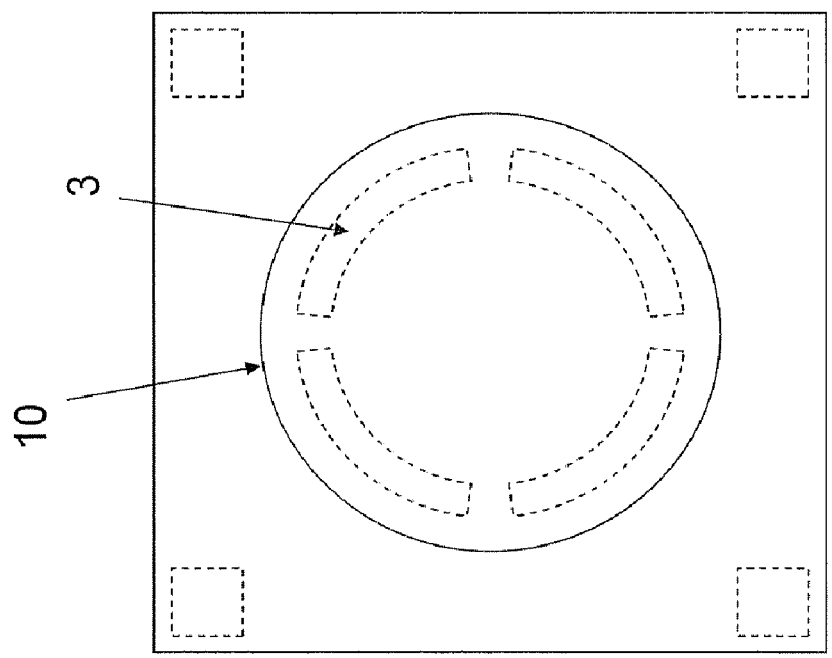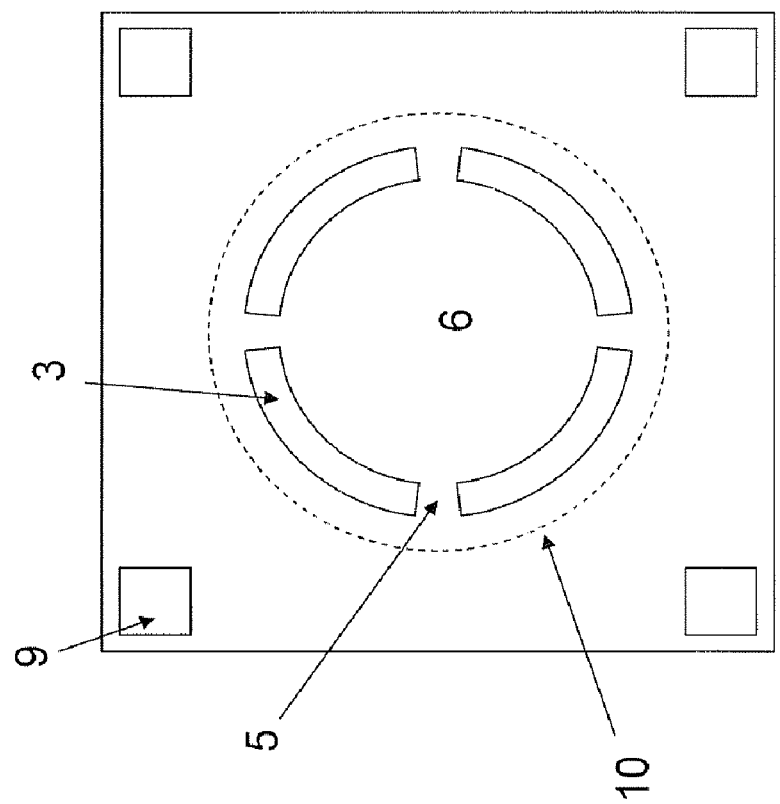
Fig. 4

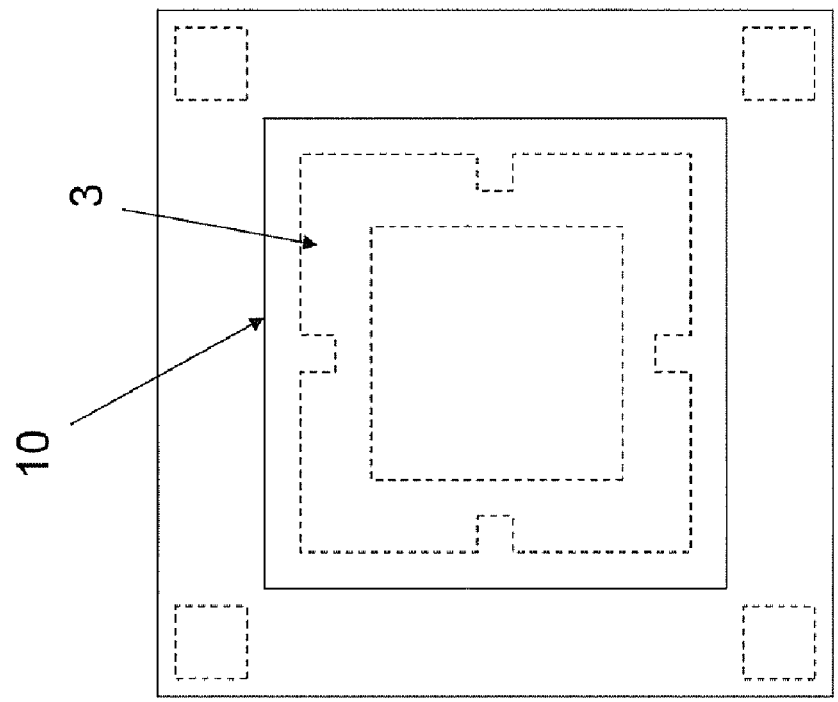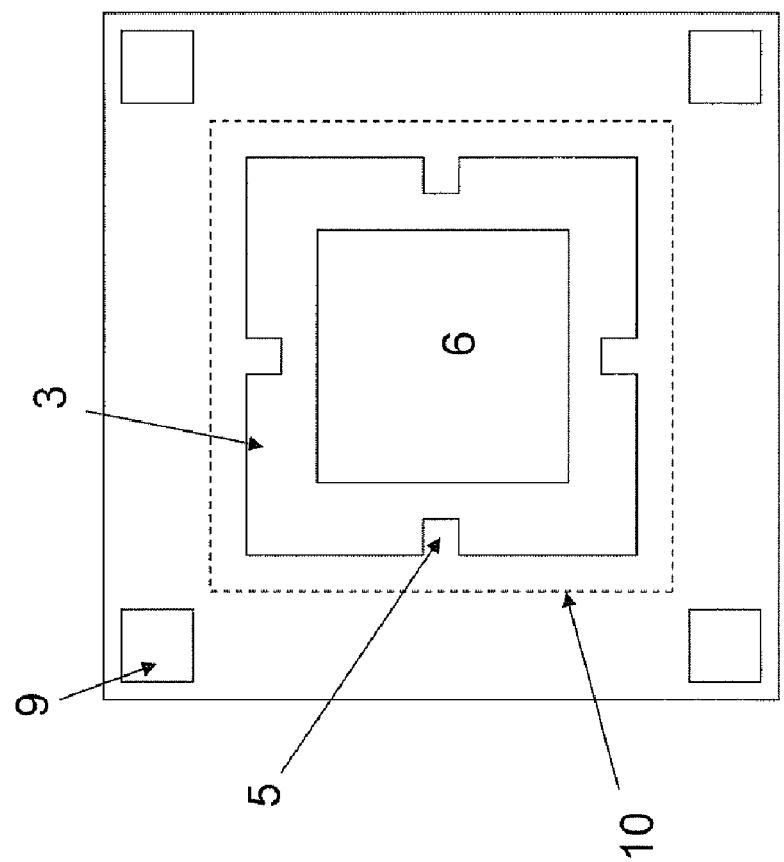
Fig. 9

CMOS COMPATIBLE PRESSURE SENSOR FOR LOW PRESSURES

CROSS-REFERENCES TO RELATED APPLICATIONS

This application claims priority from German patent application number 10 2009 060 044.2, filed Dec. 21, 2009, and claims the benefit of U.S. provisional application No. 61/293,007, titled CMOS COMPATIBLE PRESSURE SENSOR FOR LOW PRESSURES, filed Jan. 7, 2010.

BACKGROUND

Pressure sensors have become ubiquitous the last several years, finding their way into many applications, such as tire pressure monitor systems (TPMS), manifold absolute pressure (MAP) applications, for example, in automotive exhaust lines, automatic transmission gear boxes, consumer applications involving barometric pressure measurements, and others.

These pressure sensors may typically be formed on a silicon die having a diaphragm over a cavity, where the diaphragm is supported by a sidewall or bulk region. One or more sensors, such as a Wheatstone bridge consisting of diffused or implanted resistors, may be located on the diaphragm. Pressure, either from above the diaphragm or below in a cavity, deflects the diaphragm and its sensors. This deflection, and hence the pressure, can be measured by utilizing the piezo-resistive effect. That is, as the sensors are stressed due to the bending of the diaphragm, the piezo-resistive effect changes the value of one or more of the resistors that are typically configured in the Wheatstone bridge. This change in resistance results in a change in the output of the Wheatstone bridge from which the change in pressure can be inferred.

Pressure sensor performance can be improved by increasing the sensor's sensitivity. Increased sensitivity results in a larger output signal that is less affected by or compromised by noise and signal interference. Sensor performance can also be improved by improving its linearity. Improved linearity results in a more accurate pressure to output signal conversion. Unfortunately, increasing either sensitivity or linearity comes at the expense of the other.

One way to improve both sensitivity and linearity is for a portion of the diaphragm to be formed having a relatively thicker portion, which may be referred to as a boss. This boss may extend into the cavity below the diaphragm. The boss may act as a concentrator, concentrating pressure induced stress into a smaller area, thereby increasing device sensitivity. This concentration may also increase linearity. But many problems may arise with the use of this type of boss.

For example, since the boss is formed in the cavity below the diaphragm, it may be difficult to align the boss with features such as a Wheatstone bridge on the topside of the diaphragm. Additionally, manufacturing processes for said boss have to be performed on the backside of the silicon wafer, which is disadvantageous compared to standard CMOS manufacturing techniques. Also, since these bosses are typically thick, they have a relatively large mass. This mass may provide stress on the diaphragm when it is accelerated, such as when the pressure sensor is moved. Gravity may cause the boss to provide a varying stress on the diaphragm as the pressure sensor is placed in different orientations. Further, bosses are typically formed using a potassium hydroxide (KOH) etch. These etches result in a cavity having sloped sides. Sloped sides mean a greater area is consumed by the cavity, which increases the size of the pressure sensor. Moreover, an n-doped silicon wafer is needed for a KOH etch. Unfortunately, most CMOS processes are based on using a p-doped silicon wafer.

Thus, it is desirable to provide pressure sensors having bosses that have a reduced mass and are more readily aligned to features on a top side of a diaphragm. It is also desirable to have a pressure sensor with a cavity formed to provide a smaller die size in a manner compatible with conventional CMOS processes.

SUMMARY

Accordingly, embodiments of the present invention may provide pressure sensors having a topside boss and a cavity formed using deep reactive-ion etching (DRIE) or plasma etching. Since the boss may be formed on the topside, the boss may be aligned to other features on the topside of the pressure sensor, such as a Wheatstone bridge or other circuit elements. Also, since the boss may be formed as part of the diaphragm, the boss may have a reduced mass that may be less susceptible to the effects of gravity and acceleration. These pressure sensors may also have a cavity formed using a DRIE or plasma etch. Use of these etches may result in a cavity having edges that are substantially orthogonal to the diaphragm, such that pressure sensor die area may be reduced. The use of these etches may also permit the use of p-doped wafers, which are compatible with conventional CMOS technologies.

An exemplary embodiment of the present invention provides a pressure sensor having a diaphragm, a cavity located below the diaphragm, and a frame surrounding the diaphragm. Portions or trenches may be removed from the topside of the diaphragm to form a boss. The boss may be connected to the frame through one or more gaps in these trenches, which may be referred to as beams. These beams may fully connect the frame and the boss, or they may partially traverse the trench between the frame and boss. These trenches may concentrate pressure induced stress to the beams for increased sensitivity. Also, since the stress is concentrated, device linearity may be improved. Components, such as resistors, capacitors, diodes, field-effect transistors, or other devices, may be placed on the beams, boss, and frame. For example, Wheatstone bridges made using resistors may be placed on one or more beams. Since the trenches and components may be placed on the topside of the diaphragm, this configuration allows accurate alignment of the boss to the topside components. Also, since the boss is formed from the diaphragm, the boss has a reduced mass that is less susceptible to gravity and acceleration.

Another exemplary embodiment of the present invention provides a pressure sensor having a diaphragm, a cavity located below the diaphragm, and a frame surrounding the diaphragm. The cavity may be formed using DRIE or plasma etching. This etching provides a cavity having vertical sides that are orthogonal to the diaphragm. This arrangement provides a pressure sensor having a reduced footprint for a smaller die size. Using DRIE or plasma etching also allows the use of p-doped substrates. Using p-doped substrates allows components such as resistors, capacitors, diodes, field-effect transistors, or other devices to be formed on the frame, beams, or boss using conventional CMOS processing technologies.

In various embodiments of the present invention, the etching of trenches on the topside of the pressure sensors and the etching of the cavities on the bottom side of the pressure sensors may be controlled by controlling the duration, temperature, and other parameters of the etching process. In other embodiments of the present invention, etch-stop layers may be used. These layers may be oxide or other layers formed when two or more layers are bonded together. In other embodiments of the present invention, these layers may be formed as buried layers using a high energy implantation.

In one exemplary embodiment of the present invention, a pressure sensor includes a cavity having vertical sides that are orthogonal to a diaphragm. This cavity may be formed using DRIE, plasma, or other appropriate etching technique. The depth of this etch may be controlled by adjusting the duration of the etch. One or more topside trenches may be etched into the diaphragm to form a boss and one or more beams. These trenches may be formed using DRIE, plasma, or other appropriate etching technique. These trenches may have various shapes such that a boss having a square, rectangular, circular, or other shape is formed. The depth of this etch may also be controlled by adjusting the duration of the etch. One or more components, traces, and other electrical components may be formed on the topside of the pressure sensor.

In another exemplary embodiment of the present invention, a pressure sensor is formed from two wafers that are bonded together. These wafers may have oxide covered surfaces that are bonded together to form a buried oxide layer. This buried oxide layer may act as an etch stop for either the cavity or the trench etching process. This pressure sensor may have a cavity having vertical sides that are orthogonal to a diaphragm. This cavity may be formed using DRIE, plasma, or other appropriate etching technique. The depth of this etch may be controlled by adjusting the duration of the etch, or the buried etch-stop layer may be relied upon to provide an accurate depth of the etching. One or more topside trenches may be etched into the diaphragm to form a boss and one or more beams. These trenches may be formed using DRIE, plasma, or other appropriate etching technique. These trenches may have various shapes such that a boss having a square, rectangular, circular, or other shape is formed. The depth of this etch may also be controlled by adjusting the duration of the etch, or a buried etch-stop layer may be relied on. One or more components, traces, and other electrical components may be formed on the topside of the pressure sensor.

In various embodiments of the present invention, etch-stop layers may be relied on to determine the depth of either or both of the trench and cavity etchings. These etch-stop layers may be formed of oxide layers by bonding two wafers together. These etch-stop layers may also be formed as buried layers using a high-energy implantation.

Another exemplary embodiment of the present invention provides a relative pressure sensor having an enclosed cavity. This cavity may be formed in a topside of a first wafer using DRIE, plasma, or other appropriate etching techniques. The topside of this first wafer and the bottom side of a second wafer may be oxidized and bonded together. The second wafer may be thinned to a desired diaphragm thickness. One or more trenches may be etched into the topside of the second wafer to form a boss and one or more beams. These trenches may have various shapes such that a boss having a square, rectangular, circular, or other shape is formed. The depth of this etch may also be controlled by adjusting the duration of the etch, or a buried etch-stop layer may be relied on. One or more components, traces, and other electrical components may be formed on the topside of the second wafer.

Various embodiments of the present invention may incorporate these and the other features described herein. A better understanding of the nature and advantages of the present invention may be gained by reference to the following detailed description and the accompanying drawings.

BRIEF DESCRIPTION OF THE DRAWINGS

FIG. 3 illustrates top and bottom views of a pressure sensor according to an embodiment of the present invention;

FIG. 4 illustrates top and bottom views of another pressure sensor according to an embodiment of the present invention;

FIG. 9 illustrates a pressure sensor according to an embodiment of the present invention.

DESCRIPTION OF EXEMPLARY EMBODIMENTS

Figure 1:
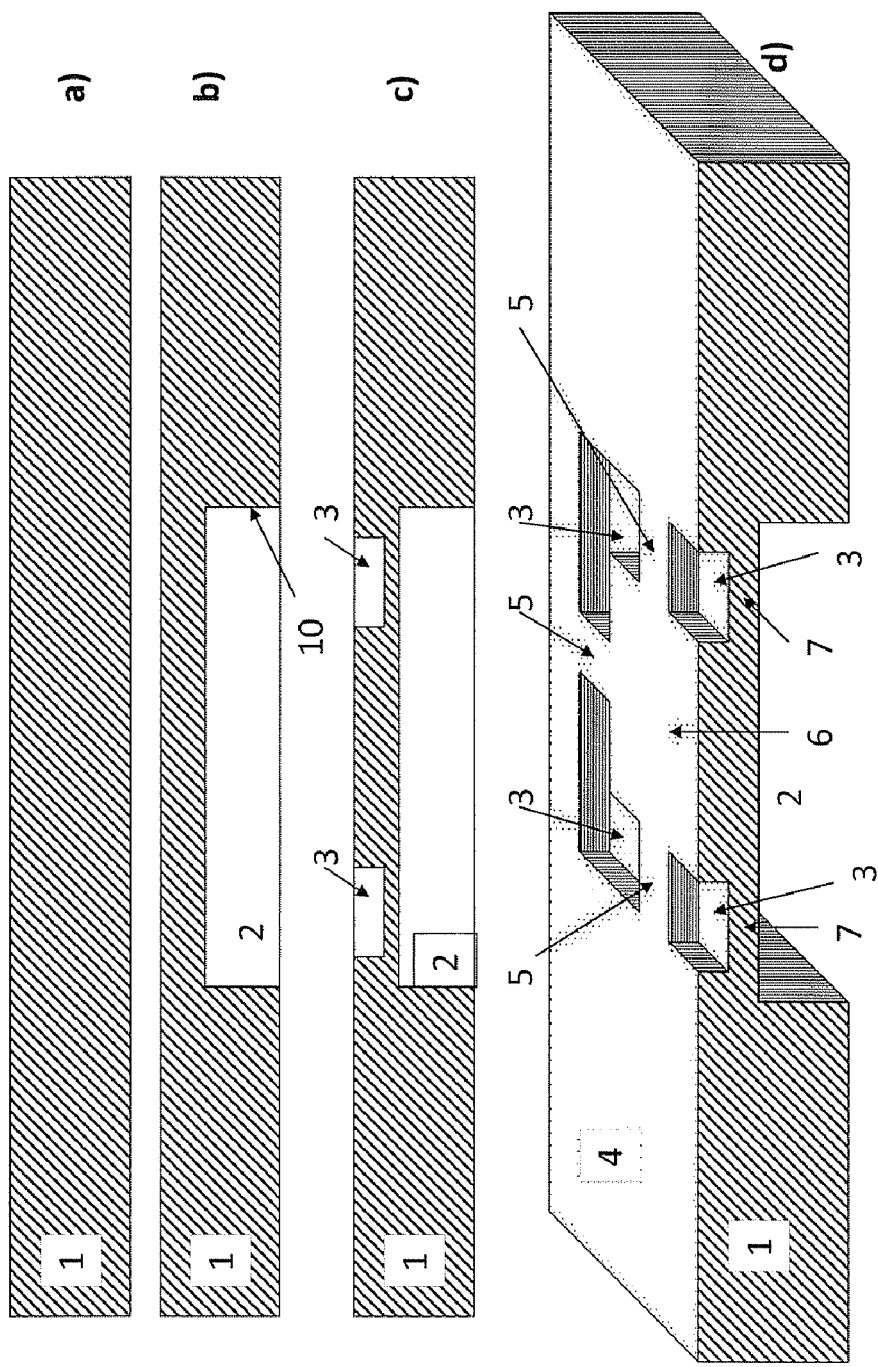
FIG. 1 illustrates various acts in the manufacturing of a pressure sensor according to an embodiment of the present invention.

FIG. 1 illustrates various acts in the manufacturing of a pressure sensor according to an embodiment of the present invention. This figure, as with the other included figures, is shown for illustrative purposes and does not limit either the possible embodiments of the present invention or the claims.

In act a), a wafer 1 is provided. This wafer 1 may be a silicon wafer, though in other embodiments of the present invention, wafer 1 may be formed using other materials, such as gallium arsenide. In a specific embodiment of the present invention, wafer 1 may be a p-doped silicon wafer. In other embodiments of the present invention, wafer 1 may be an n-doped silicon wafer.

In act b), a cavity 2 is formed in a bottom or backside of wafer 1. Cavity 2 is defined by sidewall 10. Cavity 2 may be formed using an etch, such as a deep reactive ion etch or plasma etch. Using a deep reactive ion or plasma etch allows use of a p-doped silicon wafer 1, as opposed to a KOH etch, which requires an n-doped silicon wafer 1. Using a p-doped silicon wafer 1 allows components to be integrated on the surface of the pressure sensor using conventional CMOS manufacturing techniques.

The depth of cavity 2 may be determined by the duration of the etch. In other embodiments of the present invention, as will be shown below, an etch-stop layer may be used to determine the depth of cavity 2.

By using an etch such as a deep reactive an etch or plasma etch, sidewalls 10 of cavity 2 may be substantially vertical, as opposed to sidewalls formed using a KOH etch, which tend to be sloped. Having a vertical sidewall 10 allows the resulting pressure sensor to have a smaller footprint, and therefore a smaller die size. This in turn allows more die to be manufactured per wafer, thereby reducing the cost of each pressure sensor.

In act c), trenches 3 may be formed in a top side of wafer 1. Again, these trenches 3 may be formed using a deep reactive ion etching, plasma etch, or other appropriate etch.

As can be seen in act d), trenches 3 define a boss 6. Boss 6 is relatively thin, and therefore has a reduced mass as compared to a conventional boss formed in cavity 2. This reduced mass means the pressure sensor has less sensitivity to gravity and acceleration. This reduced sensitivity is particularly useful when pressure is to be measured in a moving object, or when the object may be oriented in different ways during operation.

Trenches 3 also define beams 5. Beams 5 may connect boss 6 to frame 4. Trenches 3, and resulting beams 5 and boss 6, may be aligned to cavity 2. In this example, four trenches 3 and four beams 5 are shown, though in other embodiments of the present invention, other number of trenches may be used to define other numbers of beams.

When the pressure sensor of FIG. 1 experiences a pressure, the diaphragm, including beams 5 and boss 6, deflects or moves vertically relative to frame 4. The thicker boss 6 tends to not deflect or bend, and this concentrates the stress in beams 5. Accordingly, sensing devices, such as a Wheatstone bridge, diodes, resistors, capacitors, transistors, or other components, may be located on one or more of the beams 5. This concentration increases sensitivity of the pressure sensor. Also, the use of boss 6 increases the linearity of the resulting pressure sensor. Accordingly, in various embodiments of the present invention, the boss 6 is made thicker by the addition of material such as oxide layers. This thicker boss further acts to concentrate stress in beams 5 for increased sensitivity.

In this example, the cavity 2 is formed before the trenches 3. In other embodiments of the present invention, the order of these acts may be reversed. Also, other acts, such as back lapping, polishing, and others, are omitted for clarity and conciseness.

Figure 2:
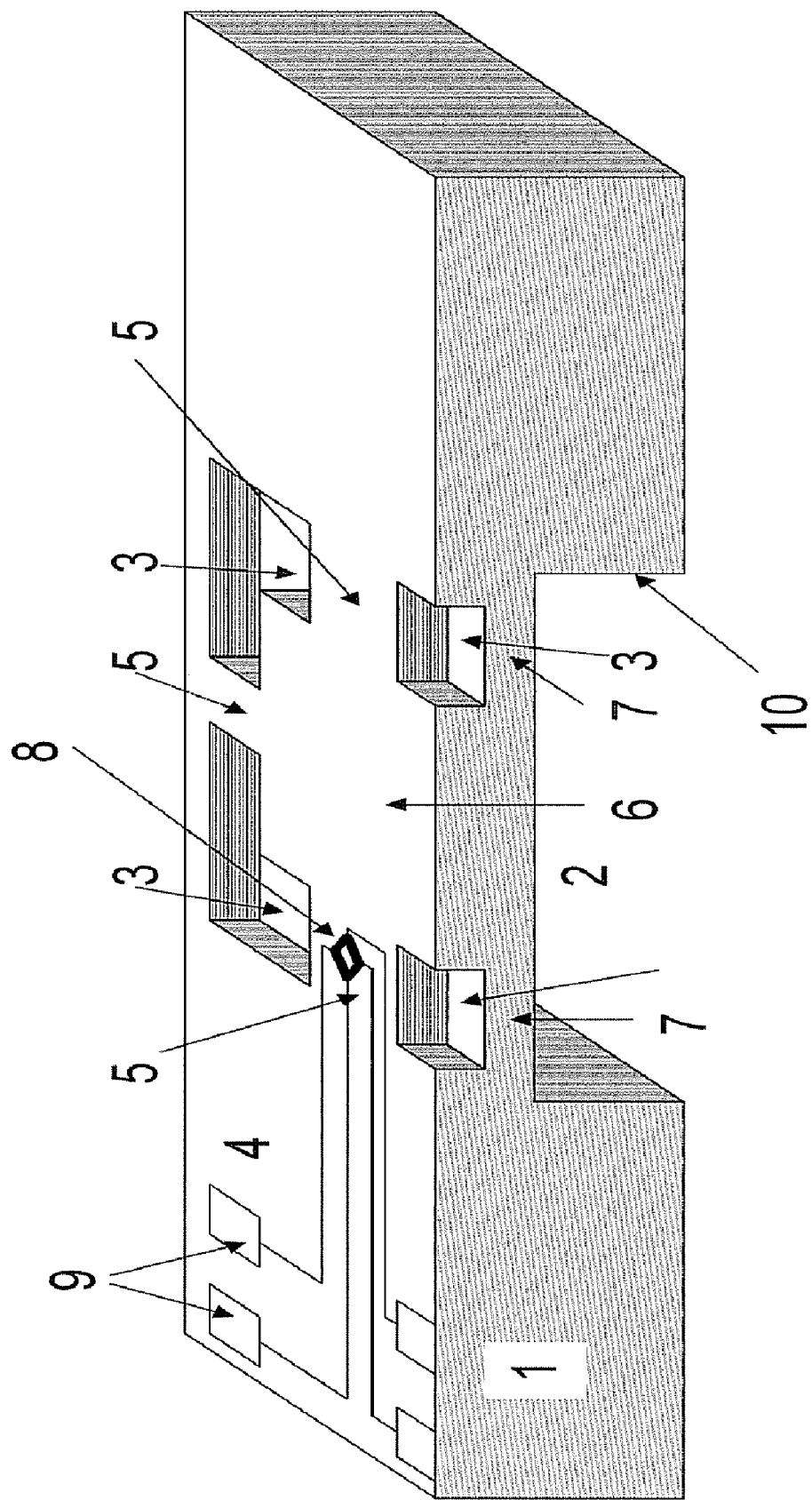
FIG. 2 illustrates a completed pressure sensor formed using the acts of FIG. 1.

FIG. 2 illustrates a completed pressure sensor formed using the acts of FIG. 1. This pressure sensor includes circuitry 8, which may be a Wheatstone bridge. Circuitry 8 provides an output proportional to pressure using the piezo-electric effect. Terminals of circuitry 8 may connect to pads 9 for electrical connection to outside circuitry.

By forming boss 6 and beams 5 on a top surface of the pressure sensor, circuitry 8, such as a Wheatstone bridge, may be properly aligned to the beams 5 and boss 6 for improved manufacturing repeatability, which may result in an improved yield.

Trenches 3 and resulting beams 5 and boss 6 may have various shapes in various embodiments of the present invention. Examples are shown in the following figures.

FIG. 3 illustrates top and bottom views of a pressure sensor according to an embodiment of the present invention. In this example, four trenches 3 form an approximately square boss 6, as well as four beams 5. In other embodiments the present invention, other numbers of trenches 3 may be employed to form different numbers of beams 5. Also, in various embodiments of the present invention, more than one boss 6 may be formed.

FIG. 4 illustrates top and bottom views of another pressure sensor according to an embodiment of the present invention. In this example, four circular trenches 3 form an approximately circular boss 6, as well as four beams 5. In other embodiments of the present invention, other numbers of trenches 3 may be employed to form different numbers of beams 5. Also, in various embodiments of the present invention, more than one of boss 6 may be formed.

Again, in various embodiments of the present invention, an etch-stop layer may be used to determine a depth of cavity 2. An example is shown in the following figure.

Figure 5:
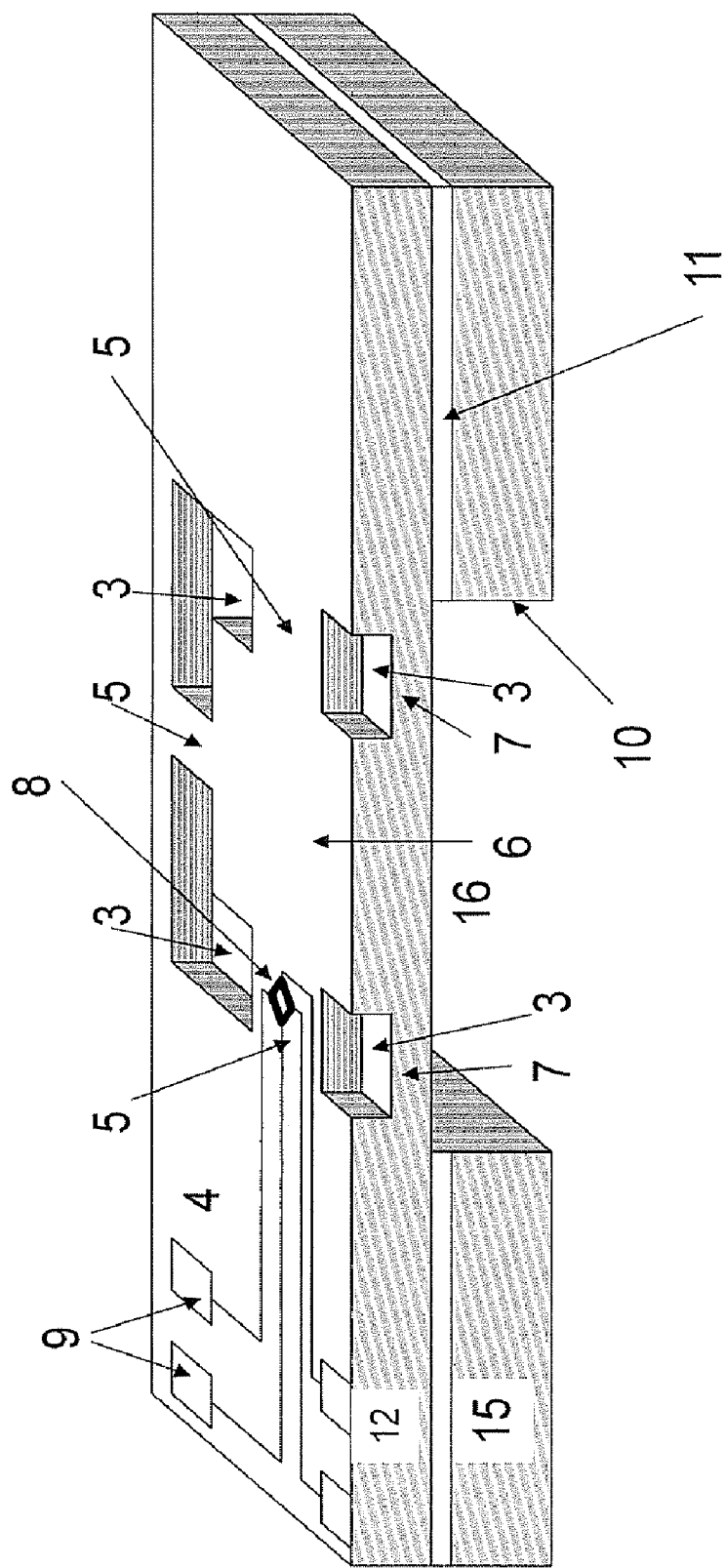
FIG. 5 illustrates a pressure sensor according to an embodiment of the present invention.

FIG. 5 illustrates a pressure sensor according to an embodiment of the present invention. This pressure sensor employs an etch-stop layer. Specifically, etch-stop layer 11 is formed between a first wafer layer 12 and a second wafer layer 15. During etching, cavity 2 may be etched at a relatively rapid rate until etch-stop layer 11 is reached. Once etch-stop layer 11 is reached, etching may proceed more slowly. In this way, the duration of the etch is less critical and the resulting depth of cavity 2 is more reproducible.

Etch-stop layer 11 may be formed in various ways. For example, a top of the first silicon wafer 15 may be oxidized. Similarly, a bottom of the second silicon wafer 12 may be oxidized. These wafers may be bonded together to form a silicon oxide layer 11, which may act as the etch-stop layer 11. A top of second silicon wafer 12 may be removed providing the second silicon wafer 12 with a desired thickness. Trenches 3 may be etched in the resulting top side of second silicon wafer 12, thereby forming beams 5 and boss 6. Wheatstone bridge or other circuitry 8 and pads 9 may be added.

In other embodiments of the present invention, layer 11 may be formed as a buried layer. This buried layer may be formed using a high energy implantation.

Like cavity 2, the etching of trenches 3 may also be controlled using an etch-stop layer. An example is shown in the following figure.

Figure 6:
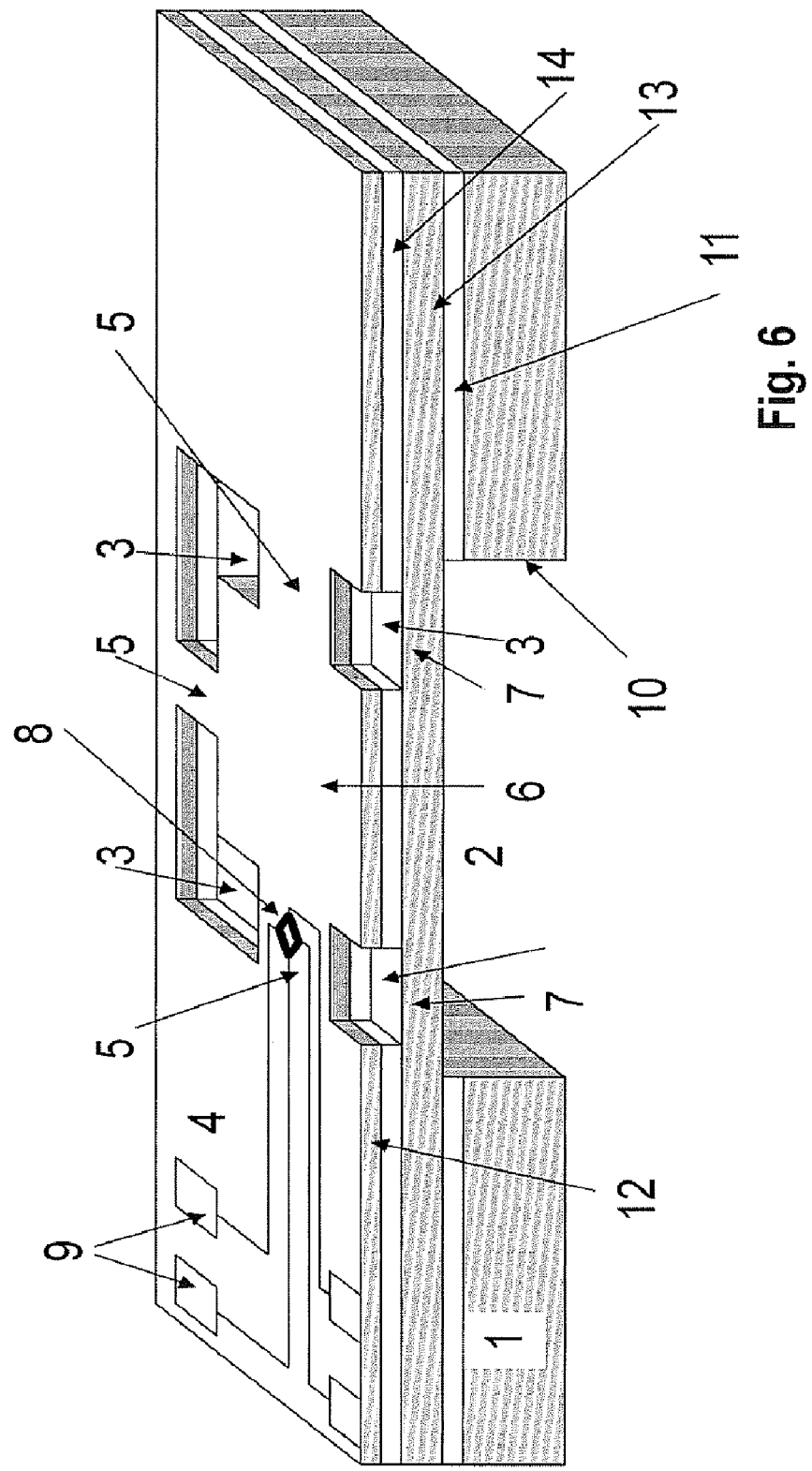
FIG. 6 illustrates another pressure sensor according to an embodiment of the present invention.

FIG. 6 illustrates another pressure sensor according to an embodiment of the present invention. In this specific embodiment of the present invention, etch-stop layers may be used to define trenches on a top side, and a cavity on a bottom side. In this example, three silicon layers 1, 13, and 12 may be separated by etch-stop layers 11 and 14. One or both of these etch-stop layers 11 and 14 may be formed by mating oxide layers of two wafers. Alternatively, one or both of these etch-stop layers 11 and 14 may be formed as a buried layer, for example, by using a high energy implantation.

As before, an etch, such as a deep reactive ion etch or plasma etch, may be used to form cavity 2 having sidewalls 10. Sidewalls 10 may be substantially orthogonal to the diaphragm which includes beams 5 and boss 6. The depth of cavity 2 may be determined by the position of etch-stop layer 11. Similarly, trenches 3 may be formed in silicon layer 12. Specifically, the depth of trenches 3 may be determined by the depth of the etch-stop layer 14. Trenches 3 may be etched using deep reactive ion etch, plasma etch, or other appropriate etched type. The sides of trenches 3 may also be vertical and substantially orthogonal to a surface of boss 6.

The pressure sensors above are of a type that may be referred to as absolute pressure sensors. The techniques described above may also be employed in manufacturing pressure sensors referred to as relative pressure sensors. Relative pressure sensors measure a pressure relative to a pressure in an enclosed reference cavity. An example of a relative pressure sensor according to an embodiment of the present invention is shown in the following figures.

Figure 7:
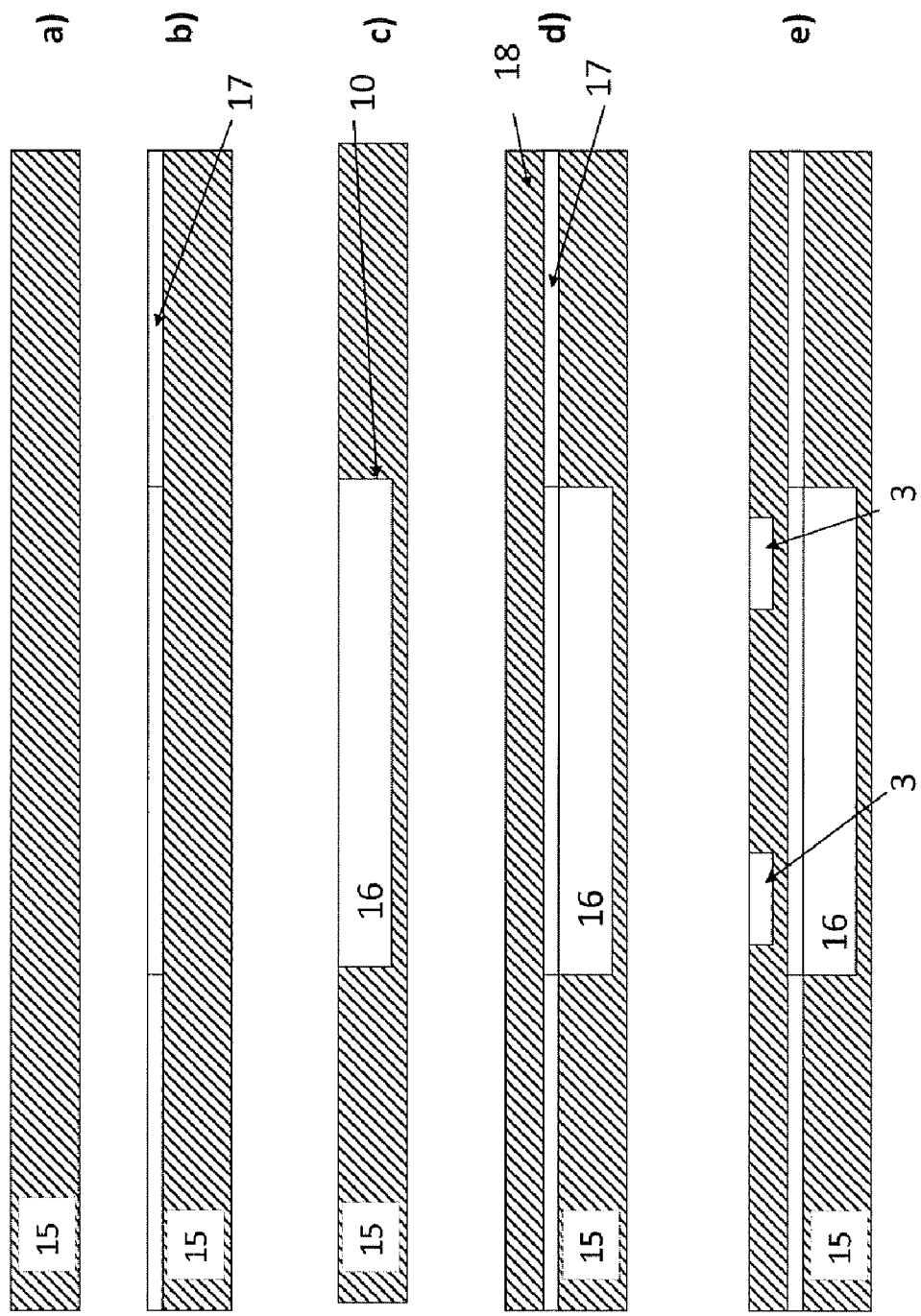
FIG. 7 illustrates acts in the manufacturing of a relative pressure sensor according to an embodiment of the present invention.

FIG. 7 illustrates acts in the manufacturing of a relative pressure sensor according to an embodiment of the present invention. In act a), a wafer 15 is provided. Again, this wafer may be formed of silicon, gallium arsenide, or other appropriate material. For example, wafer 15 may be a p-doped or an n-doped silicon wafer.

In act b), an oxide is grown on a top surface of wafer 15. In act c), a cavity 16 is etched in wafer 15. This cavity has a sidewall 10, which may be substantially vertical and orthogonal to a surface of the pressure sensor. The depth of cavity 16 may be determined by controlling a duration of the etch, or by using an etch-stop layer as described above. Cavity 16 may be formed using a deep reactive ion etch, plasma etch, or other appropriate etch. In act d), an oxide layer is grown on a top of wafer 15 and a bottom of wafer 18. These wafers are bonded together thereby forming insulating layer 17. In act d) trenches 3 may be formed in top side of wafer 18.

Figure 8:
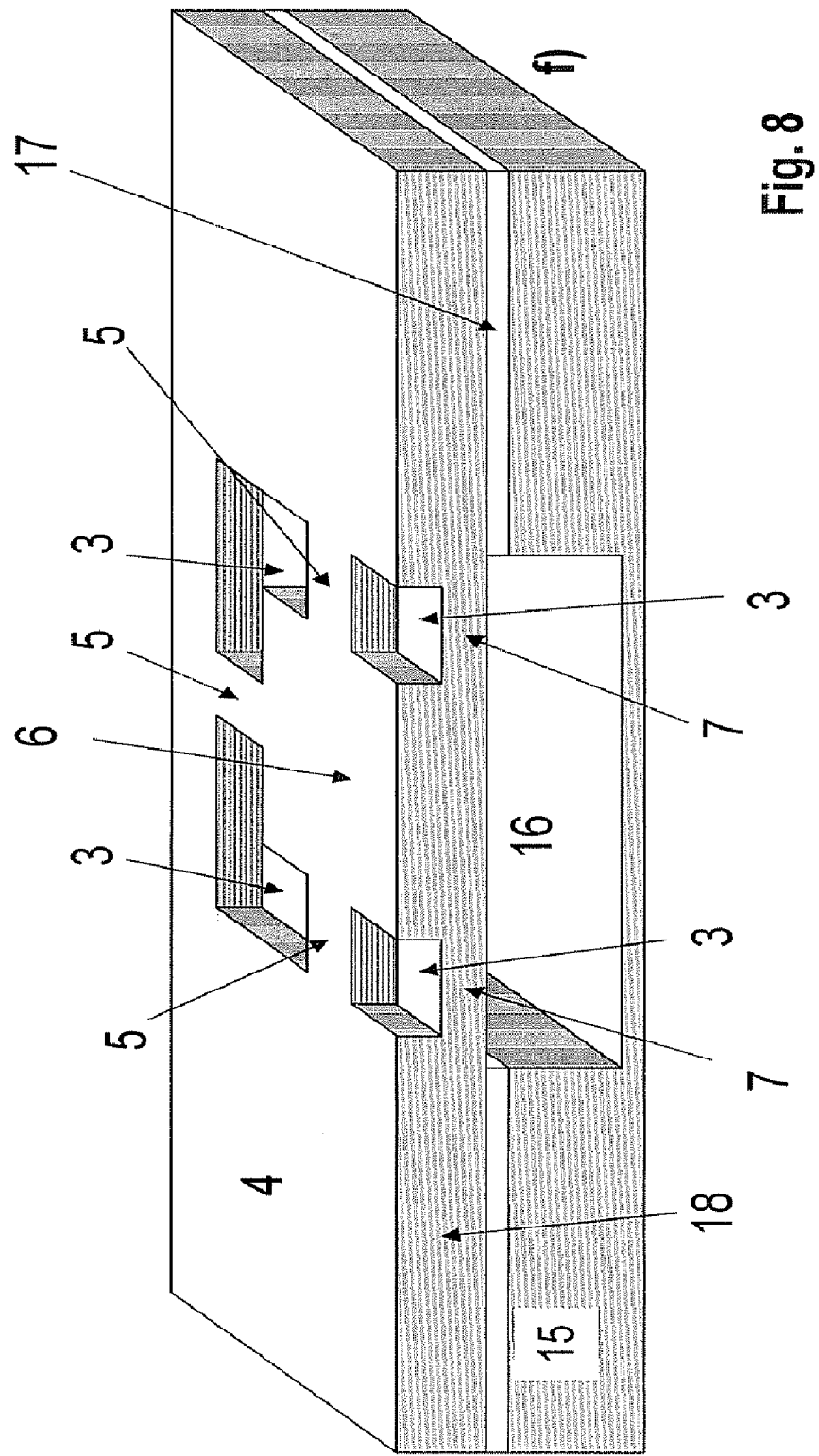
FIG. 8 illustrates a portion of a completed pressure sensor formed using the acts in FIG. 7.

FIG. 8 illustrates a portion of a completed pressure sensor formed using the acts in FIG. 7. This pressure sensor includes a reference cavity 16 located under a boss 6. Beams 5 attach boss 6 to frame 4. Sidewalls of cavity 16 are substantially orthogonal to boss 6. Similarly, sidewalls of trenches 3 are substantially orthogonal to a surface of boss 6. An insulating layer 17 is used to allow wafer layer 15 to bond to wafer layer 18. As before, trenches 3 and cavity 16 may be formed using deep reactive ion etch, plasma etch, or other appropriate etching techniques.

In the above examples, beams 5 have been shown as attaching boss 6 to frame 4. In some embodiments of the present invention, the beams do not extend this entire distance. An example is shown in the following figure.

FIG. 9 illustrates a pressure sensor according to an embodiment of the present invention. In this example, beams 5 do not fully connect to boss 6. In this specific example, a gap remains between beams 5 and boss 6, as formed by trench 3. As before, one or more components, such as a Wheatstone bridge, may be placed on beam portion 5.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A pressure sensor comprising:
   a first silicon layer comprising:
      a top portion of a frame;
      a boss; and
      a plurality of beams defined by a plurality of trenches, each of the plurality of trenches having a depth less than a thickness of the first silicon layer, the plurality of beams connecting the boss to the top portion of the frame; and
   a second silicon layer comprising a bottom portion of the frame, wherein the bottom portion of the frame is defined by an opening defined by a sidewall, the sidewall substantially orthogonal to the boss.

2. The pressure sensor of claim 1 further comprising:
   a first silicon dioxide layer between the first silicon layer and the second layer.

3. The pressure sensor of claim 2 wherein the first silicon dioxide layer is formed at least in part by oxidizing a bottom surface of the first silicon layer.

4. The pressure sensor of claim 2 wherein the first silicon dioxide layer is formed at least in part by oxidizing a top surface of the second silicon layer.

5. The pressure sensor of claim 2 further comprising at least one component located on at least one of the plurality of beams.

6. The pressure sensor of claim 2 further comprising a Wheatstone bridge located on one of the plurality of beams.

7. The pressure sensor of claim 6 wherein the Wheatstone bridge is comprised of resistors.

8. The pressure sensor of claim 6 wherein the Wheatstone bridge is comprised of field-effect transistors.

9. The pressure sensor of claim 2 further comprising a third silicon layer between the first silicon dioxide layer and the second silicon layer.

10. The pressure sensor of claim 9 further comprising a second silicon dioxide layer between the third silicon layer and the second silicon layer.

11. The pressure sensor of claim 1 wherein the first silicon layer comprises a p-doped silicon layer.

12. The pressure sensor of claim 1 wherein the sidewall is formed using deep-reactive ion etching.

13. The pressure sensor of claim 1 wherein a top side of the second silicon layer is adjacent to a bottom side of the first silicon layer.

14. The pressure sensor of claim 13 wherein the plurality of trenches are formed in a top side of the first silicon layer.

15. A pressure sensor comprising:
   a boss defined by a plurality of trench walls, the trench walls formed in a top side of the pressure sensor;
   a frame; and
   a plurality of beams defined by the plurality of trench walls and connecting the frame to the boss,
   wherein the frame comprises a backside cavity defined by a sidewall, the cavity extending from a backside opening to an underside of the boss, the backside opening forming an opening in a bottom side of the pressure sensor, the underside of the boss defined by an insulating layer, the sidewall substantially orthogonal to the underside of the boss.

16. The pressure sensor of claim 15 wherein the insulating layer is comprised of silicon dioxide.

17. The pressure sensor of claim 15 wherein the insulating layer is formed using a high-energy implantation.

18. The pressure sensor of claim 15 wherein the sidewall is formed using a first deep-reactive ion etch step and the plurality of trench walls are formed using a second deep-reactive ion etch step.

19. The pressure sensor of claim 15 further comprising at least one component located on at least one of the plurality of beams.

20. The pressure sensor of claim 15 wherein a depth of the trench walls is less than a thickness of the boss.

21. A pressure sensor comprising:
   a diaphragm defined by a cavity formed in a backside of the pressure sensor, the cavity defined by a sidewall that extends from an opening in a bottom side of the pressure sensor to an underside of the diaphragm and is substantially orthogonal to the diaphragm; and
   a frame surrounding the diaphragm,
   wherein the diaphragm further comprises a boss defined by one or more trenches formed in the diaphragm, and one or more beams connecting the boss to the frame and defined by spaces between the one or more trenches, the trenches formed in a top side of the pressure sensor.

22. The pressure sensor of claim 21 wherein the pressure sensor is formed of p-doped silicon.

23. The pressure sensor of claim 21 further comprising at least one electrical component located on at least one of the plurality of beams.

24. The pressure sensor of claim 21 wherein a depth of the trench is less than a thickness of the boss.

* * * * *